US00RE37562E

(19) United States
(12) Reissued Patent
Clark et al.

(10) Patent Number: US RE37,562 E
(45) Date of Reissued Patent: Feb. 26, 2002

(54) TURBINE SYSTEM HAVING MORE FAILURE RESISTANT ROTORS AND REPAIR WELDING OF LOW ALLOY FERROUS TURBINE COMPONENTS BY CONTROLLED WELD BUILD-UP

(75) Inventors: Robert E. Clark, Orlando, FL (US); Dennis R. Amos, Rock Hill, SC (US)

(73) Assignee: Siemens Westinghouse Power Corporation, Orlando, FL (US)

(21) Appl. No.: 09/013,470

(22) Filed: Jan. 26, 1998

Related U.S. Patent Documents

Reissue of:
(64) Patent No.: 4,940,390
Issued: Jul. 10, 1990
Appl. No.: 07/350,267
Filed: May 11, 1989

U.S. Applications:

(62) Division of application No. 07/190,324, filed on May 5, 1988, now Pat. No. 4,903,888, which is a division of application No. 07/235,026, filed on May 11, 1989.

(51) Int. Cl.[7] ..... F04D 29/02
(52) U.S. Cl. ..... 416/241 R; 415/200
(58) Field of Search ..... 416/241 R, 213 R, 416/244 R; 415/200

(56) References Cited

U.S. PATENT DOCUMENTS 3,564,689 A * 2/1971 Hirtenlechner ..... 416/241 R (List continued on next page.)

FOREIGN PATENT DOCUMENTS

| | | |
|---|---|---|
| DE | 2122 613 | 11/1972 |
| EP | 0 163 828 A1 | 12/1985 |
| EP | 0 207 259 A1 | 1/1987 |
| EP | 0 332 875 A3 | 9/1989 |
| JP | 55-72612 | 5/1980 |
| JP | 56-45269 | 4/1981 |
| JP | 56-163091 | 12/1981 |
| JP | 57-58992 | 4/1982 |
| JP | 59-50991 | 3/1984 |
| JP | 59-110723 | 6/1984 |
| JP | 62-101393 | 5/1987 |
| JP | 62-282796 | 12/1987 |
| JP | 63-157769 | 6/1988 |
| JP | 63-54480 | 10/1988 |
| JP | 63-295802 | 12/1988 |
| JP | 55-42129 | 3/1990 |
| JP | 2-127990 | 5/1990 |

OTHER PUBLICATIONS

A new method of repair welding cast components of chromium–molybdenum–vanadium steels without heat treatment; A. E. Anokhov et al.; Welding Production, vol. 33, No. 10, Oct. 1986, Cambridge GB, pp. 13–15.
Weld Repairing of Steam Turbine Rotors; Amos and Clark; Westinghouse Electric Corporation; Apr., 1984; pp. 1–8.

(List continued on next page.)

*Primary Examiner*—John Kwon
(74) *Attorney, Agent, or Firm*—Eckert Seamans Cherin & Mellott, LLC

(57) ABSTRACT

System for repairing worn surfaces of steam turbine components and especially high pressure turbine rotors, are disclosed. These systems include depositing a first layer of weld metal on a worn surface of the component, whereby a heat-affected zone is created. A second layer of weld metal is then deposited over the first layer using a greater amount of heat to temper at least a portion of the heat-affected zone produced by the first layer. The preferred embodiments include the use of gas tungsten arc welding for providing fine-grain size and more creep resistance, especially in the weld and heat-affected zone. The resulting build-up can be machined, for example into a blade fastening to produce a component having properties equal to or better than the base-metal alloy. The invention also provides a longer lasting turbine system, including rotors which have serrated steeples that are more resistant to failure.

18 Claims, 2 Drawing Sheets

U.S. PATENT DOCUMENTS

| | | | | | |
|---|---|---|---|---|---|
| 3,925,634 | A | | 12/1975 | Mulder | 219/76 |
| 4,049,186 | A | | 9/1977 | Hanneman et al. | 228/225 |
| 4,066,832 | A | | 1/1978 | Tippman | 219/76.14 |
| 4,196,335 | A | | 4/1980 | Ikeda et al. | 219/73 |
| 4,213,025 | A | | 7/1980 | Kuhnen | 219/73.2 |
| 4,218,604 | A | | 8/1980 | Masaoka et al. | 219/61.7 |
| 4,219,717 | A | | 8/1980 | Kuhnen | 219/61 |
| 4,223,197 | A | | 9/1980 | Imai et al. | 219/61.7 |
| 4,234,119 | A | | 11/1980 | Masaoka et al. | 228/125 |
| 4,247,037 | A | | 1/1981 | Tamai et al. | 228/203 |
| 4,273,512 | A | * | 6/1981 | Weiler | 416/241 R |
| 4,348,041 | A | | 9/1982 | Imai et al. | 285/286 |
| 4,406,698 | A | * | 9/1983 | Yebisuya et al. | 416/241 R |
| 4,429,019 | A | * | 1/1984 | Schrewelius | 416/241 R |
| 4,499,158 | A | * | 2/1985 | Onuma et al. | 416/241 R |
| 4,585,917 | A | | 4/1986 | Yoshida et al. | 219/76.1 |
| 4,588,869 | A | | 5/1986 | Yoshida et al. | 219/76.14 |
| 4,624,402 | A | | 11/1986 | Pitcairn et al. | 228/119 |
| 4,633,554 | A | | 1/1987 | Clark et al. | 29/156.4 |
| 4,657,171 | A | | 4/1987 | Robins | 228/119 |
| 4,710,103 | A | | 12/1987 | Faber et al. | 416/219 |
| 4,786,772 | A | | 11/1988 | Umemoto et al. | 219/8.5 |
| 4,813,806 | A | * | 3/1989 | Minami et al. | 416/213 R |
| 4,832,993 | A | * | 5/1989 | Coulon | 416/241 R |

OTHER PUBLICATIONS

A Computer Model Sensitivity Analysis of the ASME XI Manual Metal Arc Bead Technique and an Alternative Six Layer Mechanised Tungsten Inert Gas Technique; P. J. Alberry; Central Electricity Generating Board; Technology Planning and Research Division; Marchwood Engineering Laboratories; Mar. 1985.

Experiences with Weld Repair of Low Pressure Steam Turbine Rotors; R.E. Clark et al.; 47th American Power Conference, Chicago, IL; printed by Westinghouse Electric Corporation, Power Generation, Orlando, FL.

Development of the Techniques for High Pressure Rotor Weld Repair; R.E. Clark et al.; Westinghouse and Mitsubishi Tech. Seminar, Takasago, Japan; Jul. 1987.

* cited by examiner

TURBINE SYSTEM HAVING MORE FAILURE RESISTANT ROTORS AND REPAIR WELDING OF LOW ALLOY FERROUS TURBINE COMPONENTS BY CONTROLLED WELD BUILD-UP

Matter enclosed in heavy brackets [ ] appears in the original patent but forms no part of this reissue specification; matter printed in italics indicates the additions made by reissue.

This is *a reissue of Ser. No. 07/350,267 filed May 11, 1989 now U.S. Pat. No. 4,940,340 which is* a division of Ser. No. 190,324, filed May 5, 1988*, now U.S. Pat. No. 4,903, 888.*

CROSS REFERENCE TO RELATED APPLICATIONS

This application is related to co-pending application Ser. No. 168,097, filed Mar. 14, 1988, in the names of E. Clark and D. R. Amos, entitled "Repair Welding Low Alloy Turbine Components", which is assigned to the assignee of this application and which is hereby incorporated by reference.

This application is also related to co-pending application Ser. No. 092,851, filed Aug. 24, 1987, in the names of R. T. Ward and J. M. Butler, entitled "Repair of High-Pressure Turbine Rotors By Ring Welding", which is assigned to the assignee of this application and which is herein incorporated by reference.

This application is also related to application Ser. No. 763,744, filed Aug. 8, 1985, in the names of R. E. Clark and D. R. Amos, entitled "Method for Repairing A Steam Turbine Or Generator Rotor", now U.S. Pat. No. 4,633,544, issued Jan. 6, 1987, which is assigned to the assignee of this application and which is herein incorporated by reference.

This application is also related to co-pending application Ser. No. 727,175, filed Apr. 25, 1985, in the names of R. E. Clark, D. R. Amos, and L. M. Friedman, entitled "High Strength, High Toughness Welding for Steam Turbine Rotor Repair", which is assigned to the assignee of this application and which is hereby incorporated by reference.

1. Field of the Invention

This invention relates to repair procedures for worn or damaged surfaces of turbine components, and in particular, to welding techniques for building up these worn surfaces with sound metal deposits.

2. Background of the Invention

Steam turbine components made of Cr-Mo-V alloys, such as rotors and discs, provide optimum high-temperature fatigue and creep properties, but are considered difficult to weld. However, since the down time associated with replacement of these often worn, eroded, or cracked components can cost electric utilities hundreds of thousands of dollars per day, many procedures have been attempted to repair them.

One such repair procedure consists of welding an individual piece of forged steel to a worn rotor or disc. However, when this type of repair is made on a single rotor blade groove fastening, herein referred to as a "steeple", welder accessibility is very limited. Accordingly, a weld repair conducted with very limited accessibility can result in unacceptable, non-destructive examination quality due to the formation of porosity cracks and slag inclusions.

It is also known to make rotor repairs by submerged arc welding after a low volume welded seam is made between a turbine component and a forged replacement section. See Kuhnen, U.S. Pat. Nos. 4,213,025 and 4,219,717, which are herein incorporated by reference. In such a procedure, a ring forging is welded to a worn disc or rotor or a completely new rotor forging is welded to replace the entire end of the rotor. See Clark et al. U.S. Pat. No. 4,633,554, disclosing a narrow gap weld root pass followed by a gas metal arc build-up for this purpose. The lower tensile and fatigue properties obtained by employing this process, however, are generally insufficient for use in high stress rotor steeple areas.

Submerged arc welding alone has also been used for build-up repairs of rotor areas involving a wide or deep groove, where a cracked defect is not oriented longitudinally along the radius of the rotor. The main advantage of building up with submerged arc welding is that this procedure has a very high deposition rate, typically about 15 pounds of weld metal per hour. The higher deposition rate is important since many of the service rotor weld repairs are made during turbine outages, thus, time is extremely important. However, this process requires a pre-heat, produces a relatively large grain size with inferior metallurgical properties. Typically, these submerged arc weldments on low pressure rotors have a yield strength of about 85 to 100 Ksi (586 to 689 MPa) and a room temperature Charpy toughness of about 100 to 120 ft-lbs (136 to 163 J). It is also understood that submerged arc weldments are often rejected due to poor ultrasonic quality, which often reveals slag inclusions and porosity in the weld metal. Moreover, serious creep-rupture and notch-sensitivity problems have been encountered with high-pressure Cr-Mo-V rotor repair welds manufactured from submerged arc weldments. Thus, the submerged arc process is generally unacceptable for weld repairs of Cr-Mo-V rotor steeples having small, high-stress concentration radii.

Gas metal arc procedures have also been employed for repairing rotors and discs. This welding procedure deposits about 8 lbs of weld metal per hour, typically having slightly better properties than weldments produced by the submerged arc process. For Cr-Mo-V rotor repair welding, the gas metal arc weldments of steel turbine components generally have a yield strength of about 85 to 100 ksi (586 to 689 MPa), and a room temperature Charpy toughness of about 110 to 130 ft-lbs (150 to 177 J). The gas metal arc welding process associated with welding these alloys, however, is often associated with arc-blow (magnetic) process limitations which can limit the use of this process.

Recently, emphasis has been placed on the use Of gas tungsten arc welding processes (GTAW) for making repairs on Ni-Mo-V and Ni-Cr-Mo-V low pressure rotor components. See R. E. Clark, et al. "Experiences with Weld Repair of Low Pressure Steam Turbine Rotors", 47th American Power Conference, Apr. 22–24, 1985, Chicago, Ill., printed by Westinghouse Electric Corporation, Power Generation, Orlando, Fla., herein incorporated by reference. Gas tungsten arc welding has been employed for repairing individual rotor attachment grooves, cosmetic, or shallow groove repairs to correct minor surface defects. It has also been used to allow multiple build-ups of plate attachment groove locations, i.e., for a 360° application, and cladding to restore worn-away material. Gas tungsten arc welding offers relatively high ultrasonic quality, requires no pre-heat, and produces weldments having tensile and impact properties which exceed rotor material specification requirements. Low allow steel weldments produced by this process typically have a yield strength of about 90 to 115 ksi (621 to 793 MPa), and a room temperature. Charpy toughness of about 160 to 210 ft-lbs (218 to 286 J). In addition, this welding procedure produces the finest microstructural grain size of any of the above-mentioned processes.

The selection of a weld method depends on factors such as distortion, non-destructive testing acceptance limits, and mechanical property response to the post-weld heat treatment. Each area of a turbine rotor is unique, and experiences a different service duty. The absence of weld and heat affected zone cracking as well as the minimization of defects, can only be accomplished by carefully controlling a number of welding variables. For the gas tungsten arc welding process, some of these variables include amperage, alloy selection, joint geometries and travel rate. The parameters selected should be accommodating to automatic welding processes to obtain a uniform quality which is reproducible from weld to weld. These parameters must also produce superior welding characteristics such as freedom from porosity, cracking, and slag entrapment, while being accommodating to all possible repairs on rotors and discs. Finally, the alloy and welding parameters selected must produce a weld comparable to the properties of the base metal.

Accordingly, a need exists for a welding procedure that maximizes the metallurgical properties of the repaired area of turbine components. There is also a need for a welding procedure that minimize the heat affected zone and eliminates weld-related cracking.

SUMMARY OF THE INVENTION

Improved turbine systems including more failure resistant rotors and novel methods for repairing worn surfaces of steam turbines, especially high pressure turbine rotors are disclosed. The methods include welding procedures and heat treatments that minimize weld stresses and cracking. The procedures employed substantially reduce the risk of failure in ferrous Cr-Mo-V base metals of high-pressure, high temperature rotors and discs commonly found in steam turbines. This invention presents an improvement over welding forged fastenings to rotors, since welder accessibility and weldment integrity are improved. These features are particularly important with respect to high pressure, (HP), turbine components, such as rotors, which have been known to operate at pressures over 2400 psi and temperatures over 1000° F.

The invention includes depositing a first layer of weld metal on a worn surface of a turbine component and then depositing a second layer of weld metal over the first layer, using an higher application temperature, for tempering at least a portion of the "heat-affected zone" (HAZ) created in the base metal by the depositing of the first layer. As used herein, the term "heat affected zone" refers to the area of base metal immediately adjacent to the fusion zone of the weldment.

Accordingly, improved welding methods are disclosed for overcoming the occurrence of metallurgical structural problems within the heat-affected zone. The additional heat generated by the deposition of the second layer of weld metal produces an immediate heat treatment of the heat-affected zone, whereby coarse grains of the base metal are recrystallized and tempered. It is understood that when these course grains are reformulated into a finer grain structure, stress-relief cracking in the vicinity of the weld repair can be minimized.

The methods employed by this invention also avoid the over-tempering, or softening, of the base metal created by the heat of welding the first layer of weld metal. This loss in strength occurs, to a greater extent, when a stress transverse to the weld is applied, for example, high and low cycle fatigue, tensile, or creep-to-rupture. The proper control of the initial layers of weldment can significantly reduce the failure in the heat-affected zone and prevent the loss of strength in this zone below the levels of the unaffected base metal.

Further improvements disclosed by this invention include the use of bead sequencing for minimizing heat input into the base metal. Run-off tabs are also taught for minimizing weld defects created by starting and stopping the arc. In addition, a weld trail-shield is disclosed for minimizing carbon losses in the base metal which could result in lower tensile properties. Finally, parameters such as preheat-interpass temperatures, shield gas-type and flow rates, current, tungsten size and weld speed are also disclosed for achieving a higher quality weld. Procedures for single "steeple" repairs and for 360° rotor repairs are also separately disclosed.

It is, therefore, an object of this invention to provide repair welding procedures compatible with high pressure, chromium-containing rotors and other components currently in service.

It is another object of this invention to provide welding procedures, alloys, and heat treatments which provide improve notch sensitivity and increased creep ductility to repaired or new turbine components.

It is still another object of this invention to provide a repaired turbine rotor for use in high pressure service which is relatively free of weld porosity, lack of fusion and cracking resulting from the welding process.

With these and other objects in view, which will become apparent to one skilled in the art as the description proceeds, this invention resides in the novel construction, combination, arrangement of parts and methods substantially as hereinafter described and more particularly defined by the attached claims.

BRIEF DESCRIPTION OF THE DRAWINGS

The accompanying drawings illustrate a complete embodiment of the invention according to the best mode so far known for the practical application of the principles thereof, and in which.

DETAILED DESCRIPTION OF THE INVENTION

Figure 1:
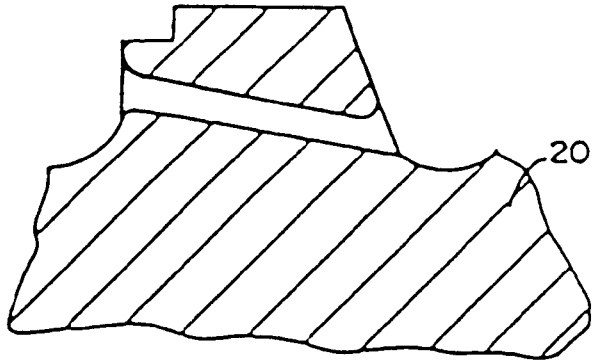
FIG. 1: is a cross-sectional view of a control stage rotor wherein the old steeples have been machined off.

The novel methods of repairing worn surfaces of ferrous turbine components of this invention include providing a ferrous turbine component 20, 40, or 50 having Cr, Mo and V alloying ingredients. These turbine components 20, 40, or 50 include worn surfaces, however it is expected that new components can be manufactured using the methods disclosed herein. The repairing procedure includes depositing a first layer of weld metal the worn surface of the component thereby producing a heat-affected zone in that component. The procedure next deposits a second layer of weld metal on top of the first layer. This second layer is deposited with a greater amount of heat than the depositing of the first layer for tempering at least a portion of the heat affected zone produced by the first depositing step. As used herein, the term "tempering" refers to the process wherein the heat-affected zone of the base metal is re-heated and then cooled to relieve internal stress and reduce its hardness.

By carefully controlling the weld parameters for the first to five layers of weld build-up, problems associated with the heat-affected zone and resulting coarse grain structure of the base metal can be overcome. More specifically, using a gas tungsten arc weld procedure, the first layer is deposited using about 40 to 60 amperes, more preferably about 60 to 140 amperes, and most preferably, about 80 to 120 amperes of direct current. The initial layer is welded at a relatively low amperage to create as small a heat-affected zone as possible. Next, the second layer of weld metal is deposited using about 50 to 200 amperes, more preferably 75 to 175 amperes, and most preferably about 100 to 150 amperes of direct current. Alternatively, alternating current could be employed less advantageously.

The higher amperage associated with the application of the second layer of weldment has the effect of "heat treating" or tempering the relatively brittle heat-affected zone in the turbine component. Following this second layer, the third and fourth layers preferably are applied using the same amount of current as used for applying the first layer. The fifth and subsequent layers can be applied using a higher current, since it will have less of an effect on the base metal.

It must be understood that the above current preferences are ideally suited for a gas tungsten arc welding procedure using a wire size of about 0.045 inches, a 50% argon-50% helium gas mixture, and a ⅛ or 3/32 tungsten size. It is expected that the tempering effect caused by the depositing of the second layer could be accomplished by varying these and other parameters to obtain the same effect. For example, if a smaller wire size for the deposited alloy were used for depositing the second layer of weld metal, the amperage could remain about at the same setting as the setting used for depositing the first layer. This, and other techniques, are well within the knowledge of those in the welding art, and are mere variations of the principal teachings of this invention.

The ferrous alloys preferably used in this invention to repair the Cv-Mo-V components of steam turbines are selected to include one or more of the following elements: Cr, Mo, Si, C, Mn, V, Nb, and N. In a more preferred embodiment, the ferrous alloy applied to the worn component is selected to comprise about 7.0 to 11.0 weight percent Cr and about 0.1 to 3.0 weight percent Mo. One specified preferred ferrous alloy composition range consists essentially of about 0.04 to 0.22 weight percent C, 0.15 to 1.0 weight percent Mn, 0.15 to 1.0 weight percent Si, 0.0 to 0.02 weight percent P, 0.0 to 0.016 weight percent S, 0.0 to 0.8 weight percent Ni, 4.00 to 19.0 weight percent Cr, 0.43 to 2.1 weight percent Mo, 0.09 to 0.5 weight percent V, 0.03 to 0.20 weight percent Nb, 0.0 to 0.08 weight percent Al, 0.0 to 0.20 weight percent Cu, 0.005 to 0.06 weight percent N and the balance being Fe. However, the most preferred a ferrous alloy consists essentially of 0.08 to 0.11 weight percent C, 0.30 to 0.50 weight percent Mn, 0.30 to 0.50 weight percent Si, 0.00 to 0.10 weight percent P, 0.00 to 0.008 weight percent S, 0.00 to 0.40 weight percent Ni, 8.00 to 9.50 weight percent Cr, 0.85 to 1.05 weight percent Mo, 0.18 to 0.25 weight percent V, 0.06 to 0.10 weight percent Nb, 0.00 to 0.04 weight percent Al, 0.00 to 0.10 weight percent Cu, 0.01 to 0.03 weight percent N and the balance being Fe.

In further accordance to these novel methods, the depositing step can consist of welding the ferrous alloy to the worn surface of the turbine component. This welding step preferably is accomplished by any one of gas tungsten arc welding, plasma-arc welding, electron beam welding, laser-beam welding and gas metal arc welding. It is expected that other welding procedures may be used to apply the novel alloys of this invention, however, it is important that the welding procedure employed minimize the heat-affected-zone in the base metal so as to avoid unnecessary defects.

The most preferred procedure employed thus far comprises gas tungsten arc welding (GTAW) the preferred ferrous alloys to a machined or ground turbine component. GTAW is preferred because its multiple bead depositions exhibit exceptionally fine-grain size in the weld and heat-affected zone. This fine-grain size translates into exceptional low and high cycle fatigue, tensile, impact and creep-to-rupture properties.

In accordance with the preferred gas tungsten arc welding procedures of this invention, the steam turbine component 20, 40, or 50 is preheated to at least about 177° C. prior to the welding step. Side plates may be employed for "360°" welding applications on discs and rotors. As used herein, a "360°" repair refers to a procedure wherein weld metal is deposited continuously about the circumference of a turbine component, such as a rotor or disc, until a sufficient height is reached whereupon the individual steeples of the rotor are machined, or the disc is machined down to service tolerances. The side plates preferably are manufactured from Cr-Mo-V rotor steel or copper, and can be water cooled to further reduce welding side effects.

Figure 5:
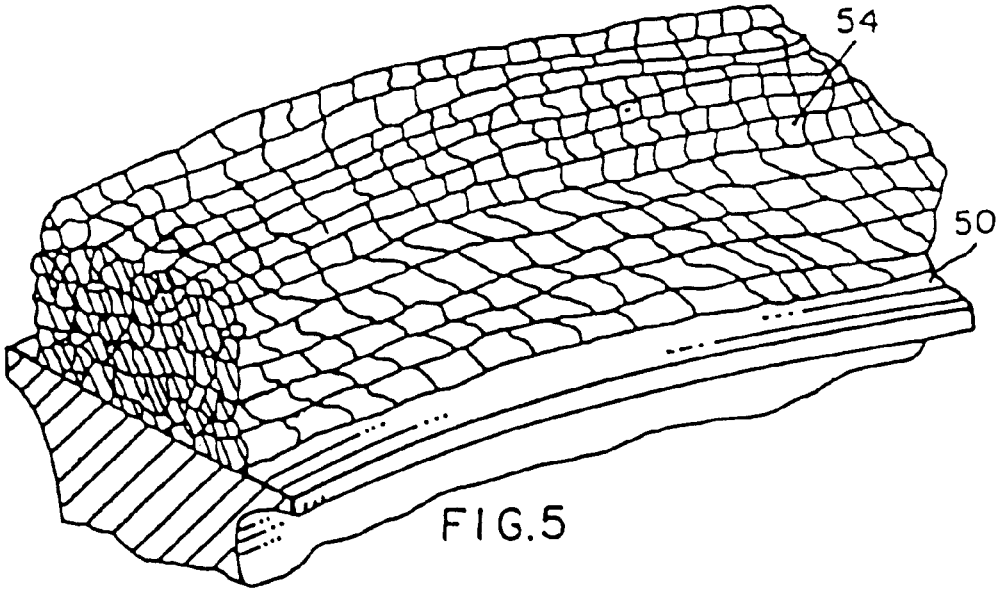
FIG. 5: is a partial perspective, illustrating a 360° repair of a rotor where the steeples have been machined and the resulting 360° weld build-up is shown.

For a 360° steeple weld build up as described in FIG. 5, a preferred procedure for high pressure rotor repairs, any steeples 44 present on the rotor are machined off to the bottom of the blade grooves to form solid ring of material. Next, a 360° weld build-up 54 is made by rotating the rotor under the weld torch, instead of moving the torch across the width of the rotor disc, as is done for individual blade fastening repair welds. For the multiple-type of repair weld, use may be made of the above-mentioned water-cooled side plates which are disposed along at least a longitudinal edge of the worn surface to contain the weld volume and minimize carbon loss in the weld deposit. The welding operation can alternatively deposit the preferred ferrous alloys of this invention against the water cooled side plates, if desired. When a single steeple repair is made on a rotor component, the worn steeple is preferably removed entirely from the rest of the rotor. Because the entire steeple is removed, the exceptional metallurgical properties associated with the fine grain structure produced by the GTAW process are present throughout the finished blade fastening machined from the weld build-up. Next, a first run-off tab is disposed along at least a first longitudinal edge of the rotor for at least providing a starting surface for the welding step. A second run off tab can be disposed on a second longitudinal edge of the rotor transversely opposed from the first longitudinal edge, for at least providing a surface for stopping the welding step. Since the attachment cites for the run-off tabs 46 can sometimes be the point of defects, a cladding procedure is used to join these run-off tabs 46 to the rotor 40. Preferably, this cladding comprises a buffering layer, containing chrome, and is disposed in at least two overlapping weldments.

During a preferred (GTAW) welding repair of a single steeple repair, a first bead is welded transversely across the rotor on the machined or otherwise prepared surface. Next, a second bead is welded transversely across the rotor on the prepared surface, and spaced apart from the first bead. The third and fourth weld beads are similarly disposed and spaced apart, if room is available. Using this intermittent welding procedure permits the immediate area of base metal underneath the weld to slowly cool prior to the next adjoining welding application. Accordingly, the brittleness associated with a weld-created, heat affected zone is minimized.

The turbine rotor 20 of FIG. 1 preferably is selected from a turbine already in service, although it is expected that new rotors without serrations can be used as the initial turbine component for the following welding procedures.

Generally the steam turbine rotors, discs and blades of this invention are manufactured from low alloy steel, commonly containing less than 6% alloying elements. Of particular importance to these applications is the Cr-Mo-V alloy, A 470, Class 8, and its modified versions. One most preferred composition includes 0.27–0.34% by weight C, 0.70–1.0% by weight Mn, 0.012% by weight P and S (max), 0.20–0.35% by weight Si, 0.50% by weight Ni (max), 1.05–1.35% by weight Cr, 1.00–1.30% by weight Mo 0.21–0.29% by weight V, 0.15% be weight Cu (max), 0.010% by weight Al (max); 0.0015% by weight Sb(max), 0.015% by weight Sn (max), and 0.020% by weight As (max). Other forging alloys which can be used for making steam turbine components for high pressure service may also be repaired through the processes of this invention, such as those containing varying amounts of Ni, Co, Cr and other alloying ingredients.

When a used turbine component, such as rotor 20, 40, and 50 are employed, the highly stressed, individual steeples 44 are preferably mechanically removed. As used herein, "mechanically removing" refers to any of the known procedures for removing metal, including but not limited to, grinding, machining, electric arc gouging, and other methods known to those in the metallurgy arts. As in the case of FIG. 4, the entire worn or damaged steeple should be removed since it is important to reduce the possibility of creating any weak heat-affected zones in the high stress areas of these components by subsequent welding operations.

Figure 2:
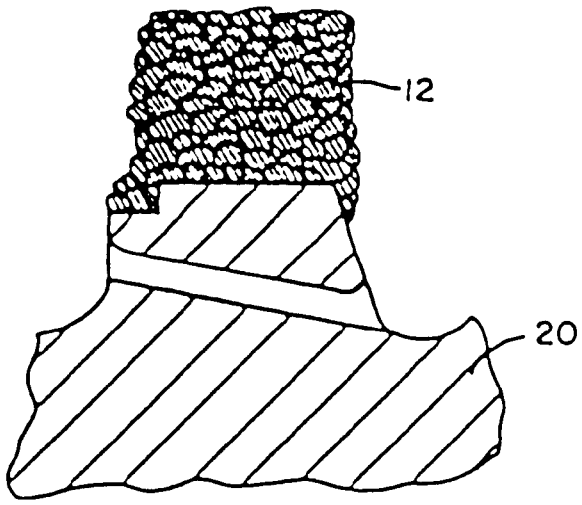
FIG. 2: is the cross-sectional view of the control stage rotor of FIG. 1, illustrating a weld build up disposed on the machined surface.
Figure 3:
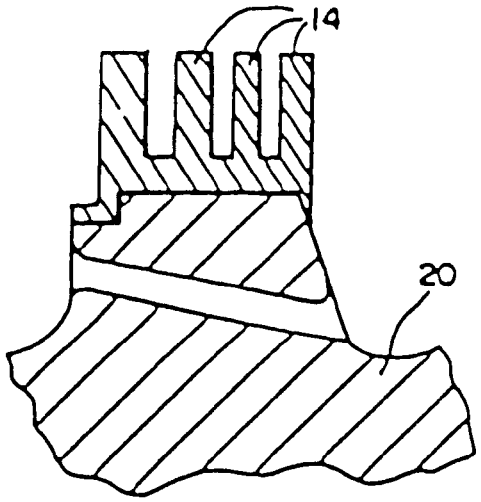
FIG. 3: is the partial, cross-sectional view of the control stage rotor of FIG. 2, illustrating machined and repaired steeples.
Figure 4:
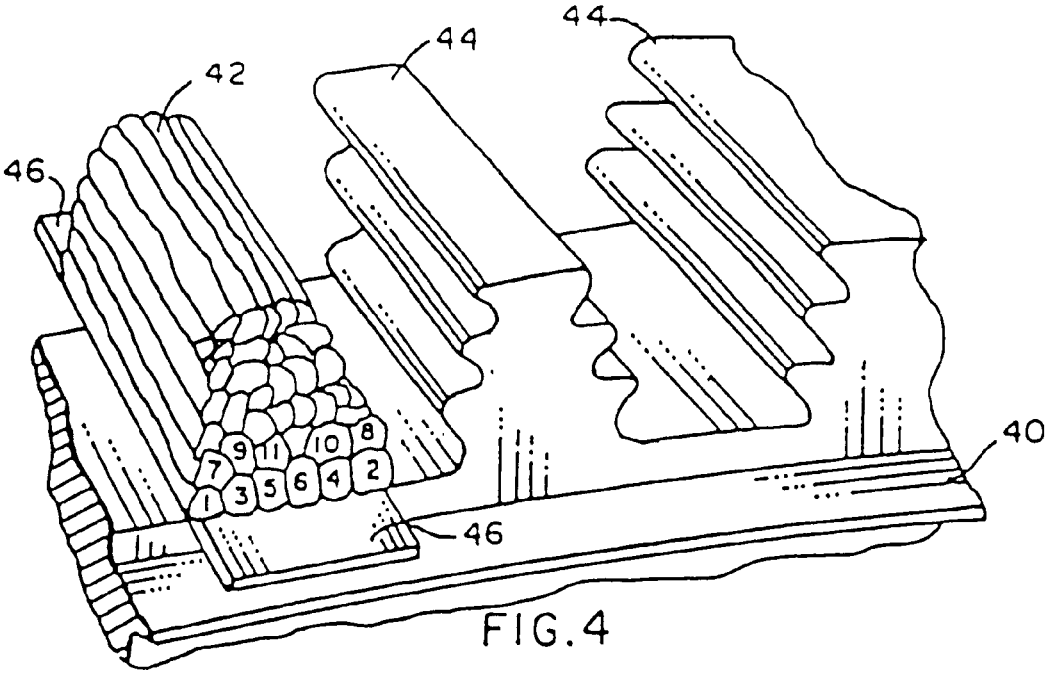
FIG. 4: is a partial prospective of a single steeple repair technique, illustrating the use of run-off tabs and bead sequencing.

As generally described in FIGS. 2, 4 and 5, the preferred ferrous alloy compositions of this invention can be deposited by welding them to the worn or damaged surface of the turbine component 20, 40 or 50. This welding step can be accomplished by any one of the known welding techniques, but preferably any one of gas tungsten arc welding, plasma-arc welding, electron beam welding, laser-beam welding, and gas metal arc welding. A preferred preheat of at least about 100° C. to about 300° C., more preferably about 177° C. to about 204° C., can be employed for reducing stresses in the turbine component 20, 40, or 50 prior to the welding step.

In preparation for the preferred gas tungsten arc welding procedure of this invention, the surfaces to be welded are preferably conditioned to bright metal. More preferably, the base metal surfaces are cleaned for a distance of about 2 inches from the weld area with denatured alcohol, acetone, methyl chloroform, or solvent cleaner. It is further noted that if methyl chloroform is applied, it should be followed with an alcohol, acetone or solvent wash. It is also advised that the base metal surface to be welded be inspected using non-destructive testing procedures, and that at least one sixteenth inch of additional metal be removed beyond the deepest crack or fatigued area found.

In accordance with the preferred GTAW procedure of this invention, the following welding parameters have been deemed useful:

TABLE II

| Parameter | Layer 1,3,4 | Layer 2 | Remainder of Weld |
|---|---|---|---|
| Nature of Current | Pulsed 60% | Pulsed 60% | Straight (no pulse) |
| Amperage-DCSP | 85–120 | 100–150 | 280 |
| Voltage | 8.5–9.0 | 9.0–10 | 11–13 |
| Surface Speed (Linear), Inch | 4.0 | 3.0 | 4.5–8.0 |
| Frequency of Pulse | 3 cycles/sec | 3 cycles/sec | None |
| Type of Travel | OSC | OSC | Straight |
| Osc. Amplitude | .22 | .22 | 0 |
| Wire Feed Speed, inches per min. | 5–25 | 5–20 | 50 |
| Tungsten Size, 2% Thorium, inch dia | 1 or 3/32 | 1 or 3/32 | 1 |
| Tungsten Stickout, inch | 1–1 | 1–1 | 1–1 |
| Wire Size, inch dia | .045 | .045 | .045 |
| Primary Shield, Argon-Helium | 50% + 50% | 50% + 50% | 50% + 50% |
| Trail Shield, Argon | 100% | 100% | 100% |
| Bead Overlap | 50% | 50% | 50% |

As described in FIG. 4, the bead sequence for the welding application should provide spaced bead sequencing, i.e., depositing a first bead 1 transversely across the preferred rotor 40 on the machined surface and then welding a second bead 2 on the prepared surface, transversely across the rotor 40 and spaced apart from the first bead. By working the weld metal from the outside to the inside of the welded areas for beads 1–10, etc, less of a heat affected zone (HAZ) is created by the welding procedure. Peening is not advised, and the welding is preferably accomplished by an automated GTAW machine in the flat, +/−15° position. Weld stops for this machine shall be made using current tapering to a value of 15 amps or less before breaking the arc. In addition, run off tabs 46, such those shown in FIG. 4, should be used for starting and stopping the weldment, since these locations may develop metallurgical defects. It is also advisable that the base metal be demagnetized prior to welding to minimize arc blow.

During the welding procedure, the interpass temperature of the base metal preferably should be below 300° C., preferably below 250° C., and most preferably below 204° C. Immediately after welding, the welded turbine component 20, 40, or 50 and its weldment 12, 42, or 54 should be maintained at a temperature of about 149° C. to about 260° C., preferably about 176° C. to about 204° C. After this post-heat maintenance schedule, the welded turbine component 20, 40, or 50 can be given a post-weld heat treatment above 500° C., preferably above 600° C., and more preferably about 663° C. The post-weld heat treatment temperature should be selected to minimize weld stresses, provide sufficient "tempering back" of the weld and heat affected zone hardness, and if necessary, prevent "over tempering" of the unaffected base metal to obtain the required weld strength. The preferred rotor repair techniques of this invention generally include a port-weld heat treatment locally at the repair weld area. This local stress relief consists of heating the entire repair area and also axially along the rotor to meet any preselected axial and radial temperature gradient.

Following the post-weld heat treatment of the welded area, the turbine components 20, 40 and 50 repaired by the above-mentioned procedures are blast cleaned and provided with a nondestructive examination, for example, magnetic particle, dye penetrant or ultrasonic testing. In addition, mechanical testing is conducted by determining the hardness of the weld deposit and by tensile testing metal coupons that were fabricated during the same welding operation. The turbine component is then ready for final dimensional checks and a finishing machining operation, i.e. to produce individual serrations 14.

From the foregoing, it can be realized that this invention provides improved procedures for repairing ferrous steam turbine components. The welding methods, alloys, and heat treatment schedules provide a repaired surface exhibiting improved high temperature properties which may include, for example, better creep and fatigue properties than the base metal of such components. Although various embodiments have been illustrated, this was for the purpose of describing, and not limiting the invention. Various modifications, which will become apparent to one skilled in the art, are within the scope of this invention described in the attached claims.

We claim:

1. In a steam turbine system of the type having a ferrous steam turbine component, said component having a worn surface thereon, the improvement comprising:

(a) a first layer of weld metal deposited on said worn surface, said deposition of said first layer producing a heat-affected zone in said component; and (b) a second layer of weld metal deposited to said first layer, said deposition of said second layer tempering at least a portion of said heat-affected zone in said component, wherein said turbine component comprises about 1.05% to 1.35% by weight Cr, about 1.00% to about 1.30% by weight Mo, and about 0.21% to 0.29% by weight V.

2. The system of claim 1 wherein said turbine component comprises a rotor.

3. The system of claim 2 wherein said first layer of weld metal comprises a plurality of weld beads disposed transversely across said rotor.

4. The system of claim 3 wherein said second layer of weld metal comprises a plurality of weld beads disposed transversely across said rotor.

5. The system of claim 4 further comprising steeples machined from a weld build up comprising at least said first and second layers of weld metal.

6. The system of claim [1] *5* wherein *at least one of* said [steeple] *steeples* has a higher creep resistance than that of the ferrous steam turbine component.

*7. The system of claim 1 wherein said turbine component further comprises greater than 0.27% by weight C, and less than about 0.34% C.*

*8. In a steam turbine system of the type having a ferrous steam turbine component, said component having a worn surface thereon, the improvement comprising:*

*(a) a first layer of weld metal deposited on said worn surface, said deposition of said first layer providing a heat-affected zone in said component; and*

*(b) a second layer of weld metal deposited above said first layer, said deposition of said second layer tempering at least a portion of said heat-affected zone in said component, wherein said turbine component comprises about 1.05% to 1.35% by weight Cr, about 1.00% to about 1.30% by weight Mo, about 0.21% to about 0.29% by weight V, and greater than 0.27% C.*

*9. The system of claim 8, wherein said turbine component further comprises less than about 0.34% by weight C.*

*10. The system of claim 8, wherein said turbine component comprises a rotor.*

*11. The system of claim 10, wherein said rotor is a high pressure rotor.*

*12. The system of claim 8, wherein said first layer of weld metal comprises a plurality of weld beads disposed transversely across said turbine component.*

*13. The system of claim 8, wherein said second layer of weld metal comprises a plurality of weld beads disposed transversely across said turbine component.*

*14. The system of claim 12, further comprising steeples machined from a weld build up comprising at least said layers of weld metal.*

*15. The system of claim 14, wherein at least one of said steeples has a higher creep resistance than a creep resistance of said turbine component.*

*16. The system of claim 8, wherein said worn surface includes high temperature properties that are improved compared to high temperature properties of a base metal of the turbine component.*

*17. The system of claim 16, wherein the high temperature properties include creep and fatigue properties.*

*18. The system of claim 8, wherein said worn surface is substantially free of weld porosity, cracking, and lack of fusion.*

* * * * *